(12) United States Patent
Yamane et al.

(10) Patent No.: US 8,013,096 B2
(45) Date of Patent: Sep. 6, 2011

(54) PERFLUOROETHER MOIETY-CONTAINING POLYMER AND A SURFACE TREATING AGENT COMPRISING THE SAME

(75) Inventors: Yuji Yamane, Annaka (JP); Noriyuki Koike, Takasaki (JP); Hirofumi Kishita, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 9 days.

(21) Appl. No.: 12/511,862

(22) Filed: Jul. 29, 2009

(65) Prior Publication Data

US 2010/0029889 A1 Feb. 4, 2010

(30) Foreign Application Priority Data

Jul. 30, 2008 (JP) .................................. 2008-196812

(51) Int. Cl.
C08G 77/04 (2006.01)
(52) U.S. Cl. ............ 528/25; 528/31; 528/397; 528/401; 528/402; 528/425; 428/447
(58) Field of Classification Search ...................... 528/25
See application file for complete search history.

(56) References Cited

U.S. PATENT DOCUMENTS

2007/0149746 A1 6/2007 Yamane et al.
2008/0071042 A1* 3/2008 Yamane et al. ............... 525/474

FOREIGN PATENT DOCUMENTS

EP 1813640 A1 8/2007
EP 1897899 A1 3/2008

OTHER PUBLICATIONS

European Search Report dated Dec. 21, 2009 issued in corresponding European Application No. 09166776.

* cited by examiner

Primary Examiner — Marc S Zimmer
Assistant Examiner — Lindsay Nelson

(74) Attorney, Agent, or Firm — Birch, Stewart, Kolasch & Birch, LLP

(57) ABSTRACT

The present invention relates to a perfluoropolyoxyalkylene group-containing polymer represented by the following formula (1),

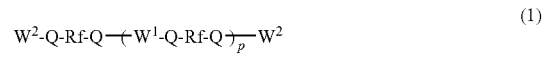
(1)

wherein Rf is a group having a perfluoropolyoxyalkylene group; $W^1$ is a divalent organosiloxane group having at least one group represented by the following formula (2); $W^2$ is a monovalent group selected from an alkyl group, an alkenyl group, an alkenyloxyalkyl group, an aryl group and an organosiloxane group represented by the following formula (3), and the combinations thereof, the monovalent group having 1 to 300 carbon atoms and being optionally substituted with one or more fluorine atoms; Q is, independently of each other, a divalent linking group having 2 to 12 carbon atoms, optionally containing one or more oxygen atoms, nitrogen atoms, or fluorine atoms; and p is an integer of from 1 to 20,

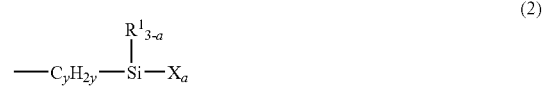
(2)

wherein X is a hydrolysable group; $R^1$ is an alkyl group having 1 to 4 carbon atoms or a phenyl group; y is an integer of from 1 to 5; and a is 2 or 3,

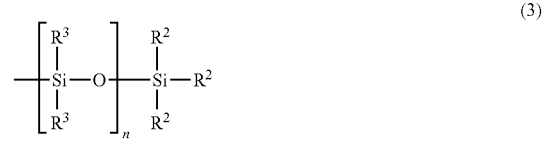
(3)

wherein, $R^2$ and $R^3$ each are, independently of each other, a group selected from an alkyl group and an aryl group, have 1 to 200 carbon atoms and may optionally be substituted with one or more fluorine atoms and; and n is an integer of from 0 to 50.

12 Claims, 2 Drawing Sheets

PERFLUOROETHER MOIETY-CONTAINING POLYMER AND A SURFACE TREATING AGENT COMPRISING THE SAME

CROSS REFERENCES

This application claims the benefits of Japanese Patent Application No. 2008-196812 filed on Jul. 30, 2008, the contents of which are hereby incorporated by reference.

FIELD OF THE INVENTION

The present invention relates to a polymer having a perfluoropolyether moiety, more specifically a polymer having a perfluoropolyether moiety having a hydrolysable group on at least one site other than both ends of its molecule chain to form a water- and oil-repellent coating; a surface treating agent composition which comprises the polymer and has good adhesion to a substrate and good curability, and the surface which is treated therewith is water- and oil-repellent and has a low dynamic friction coefficient; and an stain resistant article the surface of which has a low dynamic friction coefficient.

BACKGROUND OF THE INVENTION

Conventionally, window glass and bodies of transportation devices and window glass or outer walls of high-rise buildings are surface treated for water repellency, oil repellency or hydrophylicity in order to prevent stain. Particularly recently, the surfaces of flat-screen television sets, mobile phones, touch panels, car-navigation equipments, and portable audio players are given "stainproof" treatment or "stain easy to be removed" treatment for better appearance or visibility.

Visual devices are generally equipped with an anti-reflection film on the surface. The anti-reflection film is easily stained by stain, such as sebum, fingerprint, sweat, spit, and hairdressings. The anti-reflection film has such drawbacks, compared to a simple transparent panel, that the stain changes a degree of surface reflection of the film or that the stain stands out against a background as a white body to make images displayed thereon obscure. Therefore, it has been desired for a long time to provide an anti-reflection film which is good in an stainproof property and a stain-removing property and can keep the stainproof property for a longer time.

Generally, perfluoropolyoxyalkylene group-containing compounds have very small surface free energy, and, therefore, have water- and oil-repellency, an anti-chemical property, a lubrication property, a releasing property, and an stainproof property. Accordingly, the perfluoropolyoxyalkylene group-containing compounds are widely used to utilize their properties as a water- and oil-repellent, stainproof agent for paper and fiber; an anti-oil agent for precision instruments; a sealing agent; a releasing agent; and an stainproof agent and an anti-scratch agent in cosmetics, protection films and optical materials such as lenses, anti-reflection films, and recoding media.

For instance, the perfluoropolyoxyalkylene group-containing silane coupling agent is known which is represented by the following formula. The coupling agent has two or three hydrolysable groups on both ends and, therefore, is good in adhesion to a substrate and the surface which is treated with the afore-mentioned coupling agent is water- and oil-repellent and stain is easily wiped off (patent literature 1).

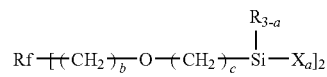

wherein Rf is a divalent linear perfluoropolyoxyalkylene group, R is an alkyl group having 1 to 4 carbon atoms or a phenyl group, X is a hydrolysable group, b is an integer of from 0 to 2, c is an integer of from 1 to 5, and a is 2 or 3.

Recently, displays of many instruments such as touch panels and various kinds of electronic devices need to be daily wiped to clean. Then, requirements for a surface slipping property and an anti-abrasion property in wiping are becoming stricter. In order to meet such requirements, the present inventors proposed a silane coupling agent containing a perfluoropolyoxyalkylene group having a hydrolysable group at one end (patent literature 2). The inventors also proposed a surface treating agent comprising a perfluoropolyether-polysiloxane copolymer which improves the touch of surface (patent literature 3).

[Patent literature 1] Japanese Patent Application Laid-Open No. 2003-238577

[Patent literature 2] Japanese Patent Application Laid-Open No. 2007-297589

[Patent literature 3] Japanese Patent Application Laid-Open No. 2008-088412

DISCLOSURE OF THE INVENTION

Problems to be Solved by the Invention

Further, the inventors also proposed a surface-treating agent comprising a perfluoropolyether-polysiloxane copolymer having hydrolysable groups at both ends and in a molecular chain (Japanese Patent Application No. 2007-311075). However, recently, a demand for the surface slipping property is stricter as touch panel type devices become more popular. Therefore, the purpose of the present invention is to provide a surface treating agent which meets the afore-mentioned demand.

Means to Solve the Problems

Thus, the present invention provides a perfluoropolyoxyalkylene group-containing polymer represented by the following formula (1),

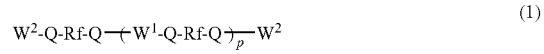

wherein Rf is a group having a perfluoropolyoxyalkylene group; $W^1$ is a divalent organosiloxane group having at least one group represented by the following formula (2); $W^2$ is a monovalent group selected from an alkyl group, an alkenyl group, an alkenyloxyalkyl group, an aryl group and an organosiloxane group represented by the following formula (3), and the combinations thereof, the monovalent group having 1 to 300 carbon atoms and being optionally substituted with one or more fluorine atoms and; Q is, independently of each other, a divalent linking group having 2 to 12 carbon atoms, optionally containing one or more oxygen atoms, nitrogen atoms, or fluorine atoms; and p is an integer of from 1 to 20, $$—C_yH_{2y}—\overset{\overset{\displaystyle R^1_{3-a}}{|}}{Si}—X_a \quad (2)$$

wherein X is a hydrolysable group; $R^1$ is an alkyl group having 1 to 4 carbon atoms or a phenyl group; y is an integer of from 1 to 5; and a is 2 or 3, $$—\left[\begin{array}{c}R^3\\|\\Si—O\\|\\R^3\end{array}\right]_n\begin{array}{c}R^2\\|\\Si—R^2\\|\\R^2\end{array} \quad (3)$$

wherein $R^2$ and $R^3$ each are, independently of each other, a group selected from an alkyl group and an aryl group, have 1 to 200 carbon atoms and may optionally be substituted with one of more fluorine atoms; and n is an integer of from 0 to 50.

The present invention also provides a surface treating agent containing the afore-mentioned perfluoropolyoxyalkylene group-containing polymer as an essential component; and an article having a cured coating made from the perfluoropolyoxyalkylene group-containing polymer and/or a partial hydrolysis condensate thereof as an essential component on the surface thereof, in particular, an anti-reflection filter, a polarization plate, glass, a resin film and a cover glass whose surface slipping property is good and stain can be easily wiped off.

EFFECTS OF THE INVENTION

Figure 1:
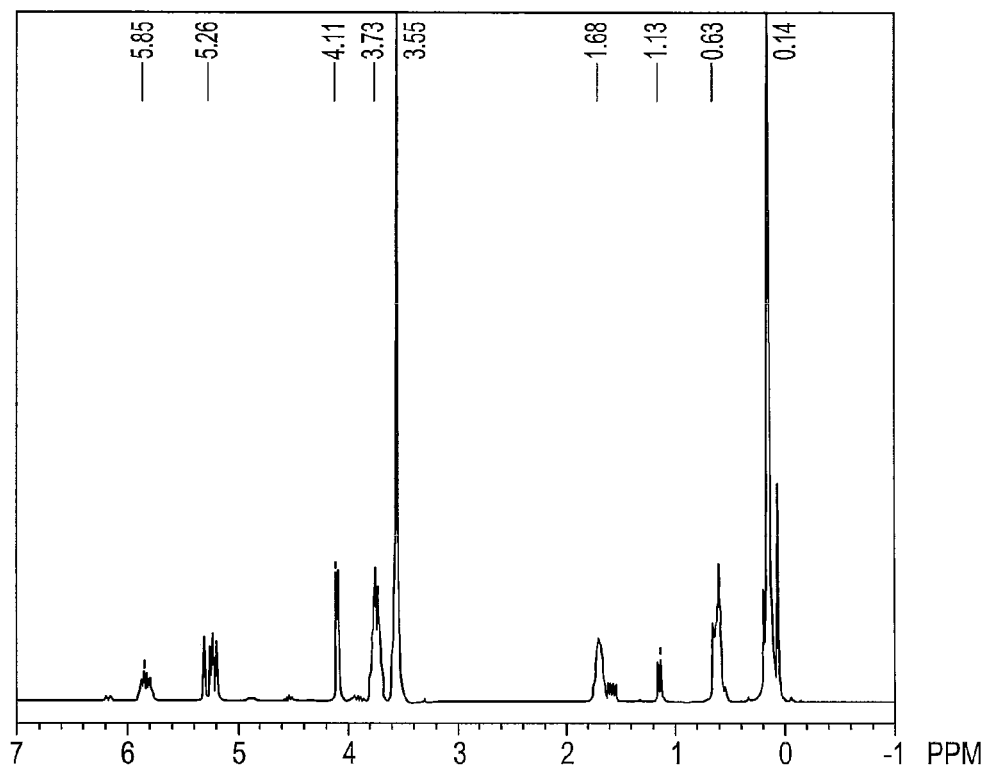
FIG. 1 is an NMR chart of compound 1 prepared in Preparation Example 1.

The perfluoropolyoxyalkylene group-containing polymer represented by the afore-mentioned formula (1) has a hydrolysable group around the central part of the molecular chain and, further, has a group selected from the particular groups on the ends of the molecule and, therefore, can give a surface a good surface slipping property without lowering the other properties such as an anti-abrasion property.

BEST EMBODIMENTS OF THE INVENTION

The present invention will be further explained in detail. In the following formula (1), $$W^2-Q-Rf-Q—(W^1-Q-Rf-Q)_p—W^2 \quad (1)$$

wherein Rf is a group having a perfluoropolyoxyalkylene group, hereinafter may be referred to as "a perfluoropolyether moiety". The afore-mentioned group may be linear or branched, but preferably linear for a better surface slipping property. For the structure of the afore-mentioned perfluoropolyether moiety, mention may be made of the one represented by the general formula $—(C_cF_{2c}O)_d—$, wherein c in the repeating unit is, independently of each other, an integer of from 1 to 6, d is an integer of from 1 to 100, preferably from 2 to 80, more preferably from 10 to 50.

For the afore-mentioned repeating unit represented by the afore-mentioned formula $—C_cF_{2c}O—$, mention may be made of the following units and the combinations of the two or more thereof.

—$CF_2O$—
—$CF_2CF_2O$—
—$CF_2CF_2CF_2O$—
—$CF(CF_3)CF_2O$—
—$CF_2CF_2CF_2CF_2O$—
—$CF_2CF_2CF_2CF_2CF_2CF_2O$—
—$C(CF_3)_2O$—

Among these, preferred are the groups having the following perfluorooxyalkylene group having 1 to 4 carbon atoms as the repeating unit.

—$CF_2O$—
—$CF_2CF_2O$—
—$CF_2CF_2CF_2O$—
—$CF(CF_3)CF_2O$—

Preferably, Rf is selected from the group consisting of the groups represented by the following general formula (4), (5) or (6), $$—C_eF_{2e}(OCF_2CF)_fO(C_gF_{2g}O)_h(CFCF_2O)_iC_eF_{2e}— \quad (4)$$
$$\qquad\qquad|\qquad\qquad\qquad\qquad|$$
$$\qquad\qquad Y\qquad\qquad\qquad\qquad Y$$

wherein Y is, independently of each other, F or $CF_3$; e is an integer of from 1 to 3; g is an integer of from 2 to 6, f and i each are an integer of from 0 to 100, provided that a total of f and i is from 2 to 100; and h is an integer of from 0 to 6; and these repeating units may be sequenced at random, $$—C_eF_{2e}(OCF_2CF_2CF_2)_jOC_eF_{2e}— \quad (5)$$

wherein j is an integer of from 1 to 100 and e is an integer of from 1 to 3, $$—C_eF_{2e}(OCF_2CF)_k(OCF_2)_lOC_eF_{2e}— \quad (6)$$
$$\qquad\qquad|$$
$$\qquad\qquad Y$$

wherein Y is F or a $CF_3$ group; e is an integer of from 1 to 3; k and l each are an integer of from 0 to 100, provided that a total of k and l is from 2 to 100; and these repeating units may be sequenced at random. More preferably, Rf is a group represented by the following general formula (7), $$—CF_2(OCF_2CF_2)_m(OCF_2)_nOCF_2— \quad (7)$$

wherein m is an integer of from 0 to 50, n is an integer of from 1 to 50, provided that a total of m and n is an integer of from 2 to 60.

The total number of the repeating units which are represented in the parentheses in the afore-mentioned chemical structural formulas is in the range of from 2 to 80, preferably from 10 to 50.

For the group $W^1$ having a group represented by formula (2) which has at least one hydrolysable group, mention may be made of a group represented by the following general formula (A) or (B), $$Si_nR^2_{2n-k}(C_yH_{2y}SiR^1_{3-a}X_a)_kO_{n-1} \quad (A)$$

$$Si_mR^2_{2m-2-k}(C_yH_{2y}SiR^1_{3-a}X_a)_kO_m \quad (B)$$

wherein $R^2$ is, independently of each other, a hydrogen atom or a monovalent hydrocarbon group, such as an alkyl group, in particular, a methyl group. $R^1$ is an alkyl group of 1 to 4 carbon atoms or a phenyl group, y is an integer of from 1 to 5, X is a hydrolysable group, and a is 2 or 3. n is an integer of from 4 to 42, preferably from 4 to 12; m is an integer of from 3 to 5; and k is an integer of from 1 to 5.

For examples of the groups represented by formula (A) or (B), mention may be made of the groups represented by the following formulas (8) to (10). The group represented by formula (8) is such that X in formula (A) is a methoxy group, $R^2$ is a methyl group, y=2, n=4, and k=1. For the group represented by (9-1) or (9-2), n=4 or 5 and k=2, respectively. For the group represented by formula (10-1), X in formula (B) is a methoxy group, m=4 and k=2.

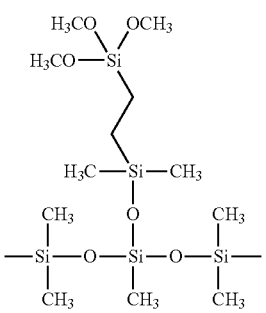

(8)

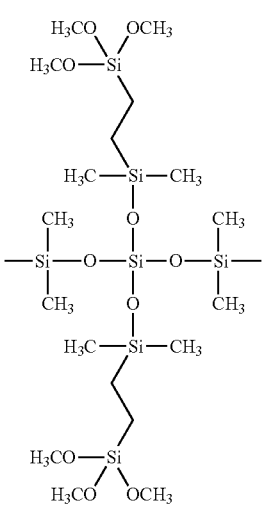

(9-1)

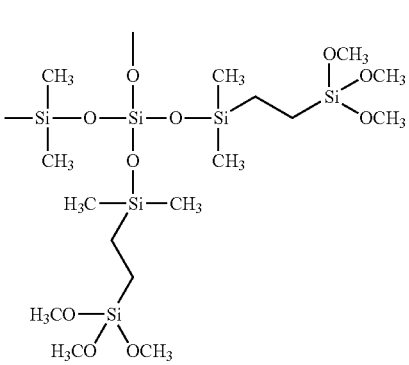

(9-2)

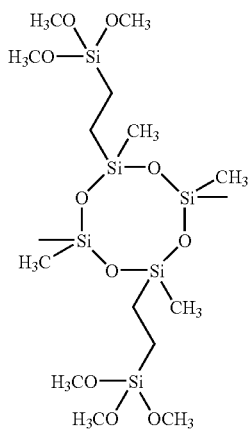

(10-1)

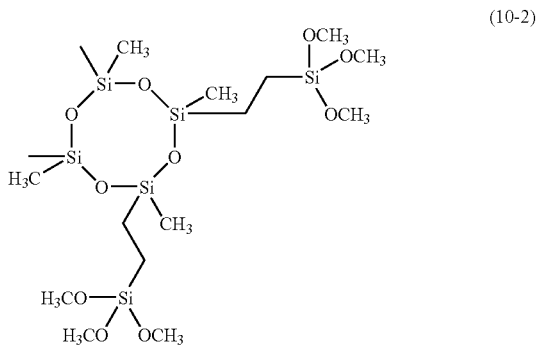

(10-2)

Among the afore-mentioned groups, the groups represented by formula (8) or (10-1) are preferred.

In formula (1), $W^2$ is a monovalent group selected from an alkyl group, an alkenyl group, an alkenyloxyalkyl group, an aryl group and an organosiloxane group represented by the following formula (3), and combinations thereof, the monovalent group having 1 to 300 carbon atoms, preferably 1 to 200 carbon atoms, and being optionally substituted with one or more fluorine atoms. $W^2$ does not react with a substrate under conditions where the hydrolysable group X in formula (2) hydrolyzes. No physical interaction occurs which worsens the surface slipping property with the substrate. For a high water- and oil-repellency, $W^2$ preferably has a fluorinated group, more preferably a perfluorinated group, having 1 to 200 carbon atoms,

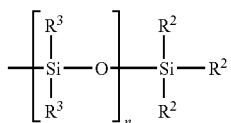

(3)

wherein $R^2$ and $R^3$ each are, independent of each other, a group selected from an alkyl group and an aryl group, have 1 to 200 carbon atoms and may optionally be substituted with one or more fluorine atoms and; and n is an integer of from 0 to 50.

Examples of $W^2$ include groups represented by the following formulas.

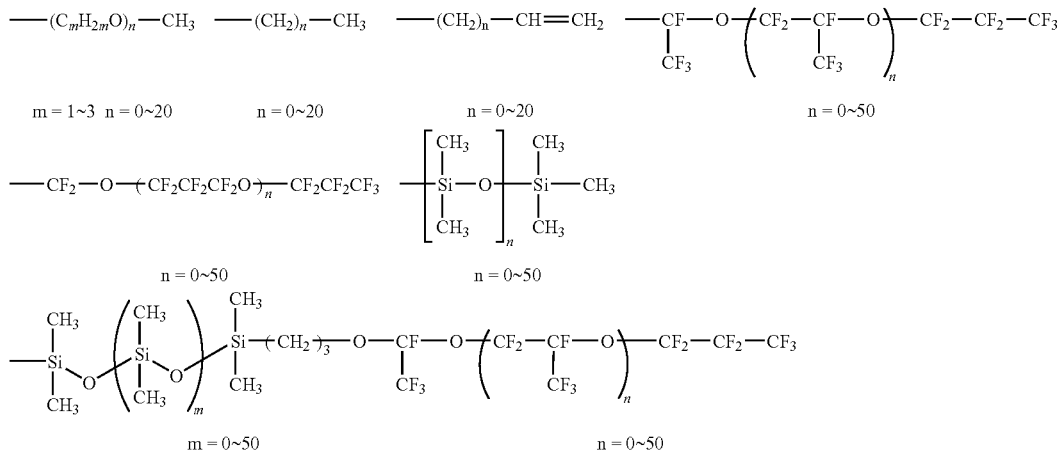

Q in formula (1) is, independently of each other, a divalent organic group having 2 to 12 carbon atoms and is a linking group between Rf and $W^1$ and between Rf and $W^2$. Q may have one or more oxygen atoms, nitrogen atoms or fluorine atoms. For instance, mention may be made of the following groups having an amide group, an ether group, an ester group or a vinyl group. In the case where $W^2$ is an alkyl group, an alkenyl group, an alkenyloxyalkyl group or an aryl group, $W^2$ is not always distinguishable from Q, so that, for instance, the terminal of $W^2$ may be Q at the same time.

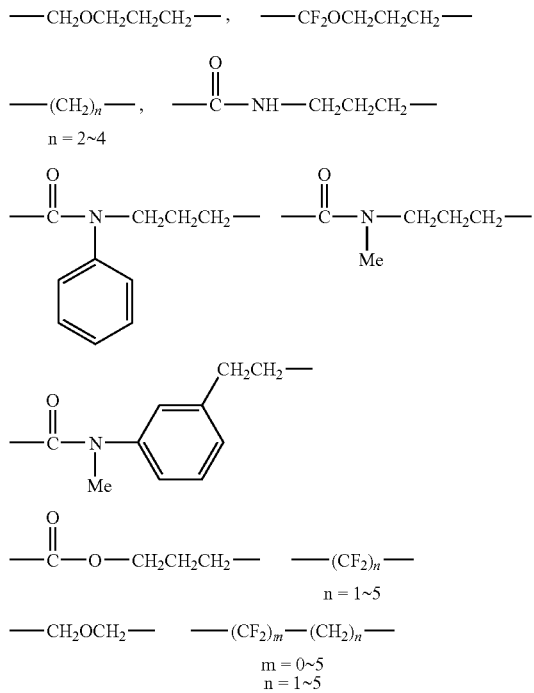

At least one, preferably at least two, and at most 20, preferably at most 10, groups represented by formula (2) are present in a molecule,

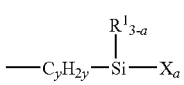

(2)

wherein X is a hydrolysable group, $R^1$ is an alkyl group of 1 to 4 carbon atoms or a phenyl group, y is an integer of from 1 to 5, and a is 2 or 3.

In formula (2), X may be same as or different from each other. Preferred examples of X include an alkoxy group having 1 to 10 carbon atoms, such as a methoxy group, an ethoxy group, a propoxy group, and a butoxy group; an oxyalkoxy group having 2 to 10 carbon atoms, such as a methoxymethoxy group and a methoxyethoxy group; an acyloxy group having 1 to 10 carbon atoms, such as an acetoxy group; an alkenyloxy group having 2 to 10 carbon atoms, such as an isopropenoxy group; and halogen atoms, such as a chlorine atom, a bromine atom, and an iodine atom. Inter alia, a methoxy group, an ethoxy group, an isopropenoxy group, and a chlorine atom are preferred.

Examples of $R^1$ include a methyl group, an ethyl group, and a phenyl group. Inter alia, a methyl group is preferred. "a" is 2 or 3, preferably 3 for better reactivity and adhesion to a substrate. "y" is 2 or more, preferably 2 to 5 for better balance between adhesion to a substrate and surface properties.

In formula (1), p is an integer of from 1 to 20 and preferably selected so as to meet the desires for properties. For instance, a smaller p is preferred for a slipping property, and a bigger p is preferred for durability. "p" is preferably from 1 to 5, more preferably 1 or 2, for the application in mobile phones, touch panels, and lenses of spectacles which require routine wiping. "p" is preferably 3 to 10 for the displays of electronic devices, television sets or large size displays installed in the open air.

The perfluoropolyoxyalkylene group-containing polymer of the present invention can be prepared by subjecting an organosiloxane having reactive groups, such as Si—H bonds, on both ends of $W^1$, and a fluorine compound having unsaturated groups on both ends of Rf in a ratio of 1:2 to an addition reaction in the presence of a catalyst for the addition reaction, such as platinum catalyst according to a conventional method and, then, addition reacting a compound having $W^2$ to the unreacted unsaturated group of Rf. Alternatively, first a structure, Rf-Q-$W^2$, may be prepared and, then reacted with an organosiloxane having $W^1$.

The present invention also provides a surface treating agent composition comprising, as an essential component, the afore-mentioned perfluoropolyoxyalkylene group-containing polymer and/or a partial hydrolysis condensate thereof. The surface treating agent may further comprise, if needed, a catalyst for hydrolysis condensation, for instance, organic titanium compounds such as tetra-n-butyltitanate; organic tin compounds such as dibutyltin dimethoxide and dibutyltin dilaurate; organic acids such as acetic acid, methanesulfonic acid, and carboxylic acid; inorganic acids such as hydrochloric acid and sulfuric acid. If these catalysts are fluorinated, such are much preferred for solubility. Among these, acetic acid, tetra-n-butyltitanate, and perfluorocarboxylic acids are particularly desirable. The addition amount is a catalytic amount, generally, 0.01 to 5 parts by weight, particularly 0.1 to 1 part by weight, relative to 100 parts by weight of the silane and/or the partial hydrolysis condensate thereof.

The surface treating agent of the present invention may be diluted with an appropriate solvent. Examples of the solvent include fluorinated aliphatic hydrocarbon solvents such as perfluoroheptane and perfluorooctane; fluorinated aromatic hydrocarbon solvents such as m-xylenehexafluoride and benzotrifluoride; fluorinated ether solvents such as methy perfluorobutylether and perfluoro(2-butyltetrahydrofurane); fluorinated alkylamine solvents such as perfluorotributylamine and perfluorotripentylamine; hydrocarbon solvents such as petroleum benzine, mineral spirits, toluene, and xylene; and ketone solvents such as acetone, methyl ethyl ketone, and methyl isobutyl ketone. Among these, fluorinated solvents are preferred for better solubility and wetting proprety. Particularly, m-xylenehexafluoride, perfluoro(2-butyltetrahydrofurane), perfluorotributylamine and a mixture thereof are preferred.

The content of the silane according to formula (1) and/or the partial hydrolysis condensate thereof in the surface treating agent is preferably 0.01 to 50% by weight, particularly 0.05 to 20% by weight.

If needed, the surface treating agent of the present invention may be mixed with another surface treating agent or a silane coupling agent or may be added to various kinds of functional coating agents such as a hard coat agent, an anti-reflection coating agent, and an anti-dazzle coating agent.

The surface treating agent of the present invention which is diluted with a solvent as described above may be applied in any known application methods, such as brushing, dipping, spraying, spin coating, and vapor deposition. The optimum temperature at which the agent is applied depends on each application method. For instance, a temperature of from room temperature to 120 degrees C. is desirable in the case of brushing or dipping. For treatment humidity, the agent is desirably applied under humidification for promoting the reaction.

The treatment conditions depend upon a silane compound or other additives used and, therefore, are desirably optimized for each treatment.

A substrate to be treated with the surface treating agent is not limited to any particular one. Use may be made of various kinds of materials, such as paper, cloth, metal or oxide thereof, glass, plastics, ceramic ware and ceramics. These substrates may be treated with a silane coupling agent, a primer, a hard coat agent, or an anti-reflection agent beforehand. The present agent may be used not only for water- and oil-repellent treatment or stainproof treatment, but also in an adhesive tape and a resin-shaping mold as a releasing agent.

The film thickness of the cured coating formed on a surface of various substrates described above is properly selected depending on kinds of the substrates, and is generally from 0.1 nm to 5 micrometers, particularly from 1 to 100 nm. In the case where the agent is used on an anti-reflection film, the thickness is preferably 10 nm or less so as not to affect optical properties.

The surface treating agent of the present invention can be used in the following applications: coating for preventing stain by fingerprint or sebum from adhering to car navigation equipments, mobile phones, digital cameras, digital camcorders, PDA's, portable audio players, car audio devices, game machines, lenses of spectacles, lenses of cameras, filters of lenses, dark glasses, medical devices such as gastric cameras, copy machines, personal computers, liquid crystal displays, organic EL displays, plasma displays, touch panel displays, protection films, and optical parts such as anti-reflection films; water-repellent, stainproof coating for sanitary products such as bathtubs and washbasins; stainproof coating for window glass of automobiles, trains, and airplanes and head lamp covers; water repellent, stainproof coating for building material for exterior wall; grease build-up preventing coating for kitchen building material; water repellent, stainproof, bill-, poster- and graffiti-preventing coating for telephone booths; water repellent coating for preventing adhesion of finger print on artworks; coating for preventing adhesion of fingerprint on compact discs and DVD's; and for modifying flowability and dispersibility of paint additives, resin modifying agents, and inorganic fillers, or improving a lubrication property of tapes and films.

EXAMPLES

The present invention will be explained in detail by the reference to the Examples and to the Comparative Examples, but shall not be limited thereto.

The evaluation methods used in the Examples are as follows.
Water- and Oil-Repellency
Water contact angles and oleic acid contact angles of the cured coating were measured on a contact angle meter, Drop Master from Kyowa Interface Science Co., Ltd.
Dynamic Friction Coefficient
The dynamic friction coefficient against Bemcot from Asahi Kasei was measured in the following conditions on a surface property test machine from Shinto Scientific Co., Ltd.
Contact area: 35 mm×35 mm
Load: 200 g
Slipping Property
Seven panelists each rubbed the surface of a cured coating on a substrate with their thumb via a piece of Bemcot (ex Asahi Kasei) to evaluate the slipping property, based on the following evaluation criteria.
A: especially good,
B: good,
C: average,
D: bad.
Wiping Property of Sebum Stain
Seven panelists each smeared sebum of their forehead on the surface of a cured coating with their finger, wiped off the sebum stain with a piece of Bemcot (ex Asahi Kasei) to evaluate the wiping property based on the following evaluation criteria.
A: easily wiped off,
B: possible to wipe off,
C: sebum remains slightly after the wiping,
D: impossible to wipe off.

Abrasion Procedure

Abrasion procedure on the cured coating was performed on a reciprocating abrasion test machine, HEIDON 30S from Shinto Scientific Co., Ltd., in the following conditions.

Evaluation environment conditions: 25 degrees C., humidity of 40%

Rubbing member: the tip of the tester (20 mm×30 mm) to be contacted with a sample was wrapped with a pile of eight pieces of non-woven cloth and fixed with a rubber band.

Load: 1 kg
Rubbing distance (one way): 40 mm
Rubbing speed: 4,800 mm/min
Number of reciprocation: 10,000

Preparation Example 1

1,100 g of the perfluoropolyether having unsaturated bonds on the both ends, represented by the following formula (I)

$$Rf—[—CH_2—O—CH_2—CH=CH_2]_2 \quad (I)$$

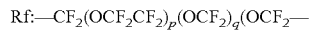

(p/q=0.9, p+q=45 on average),
56 g of the siloxane having SiH groups on the both ends, represented by the following formula (II),

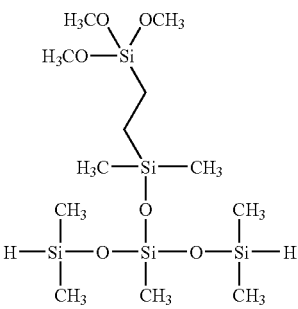

1,320 g of m-xylenehexafluoride, and 0.35 g of a solution of chloroplatinic acid/vinyl siloxane complex in toluene (containing $9\times10^{-8}$ mole of Pt) were mixed, and heated to 90 degrees C. with stirring for 3 hours. Then, the solvent was distilled off under reduced pressure to obtain 1,100 g of a pale yellow, transparent liquid perfluoropolyether, hereinafter referred to as compound 1.

The $^1$H-NMR spectrum of compound 1 is shown in FIG. 1 and the chemical shifts are shown below.

$^1$H-NMR (reference: TMS, ppm)

| | |
|---|---|
| —SiCH$_3$  —CH— | 0~0.2 ppm |
| ≡SiCH$_2$CH$_2$Si≡ | 0.5~0.7 ppm |
| CH$_3$ | 1.1~1.2 ppm |
| —CH$_2$CH$_2$Si≡ | 1.6~1.8 ppm |
| —SiOCH$_3$ | 3.4~3.7 ppm |
| —CH$_2$OCH$_2$— | 3.6~3.8 ppm |
| H$_2$C=CH—CH$_2$—O— | 4.0~4.2 ppm |
| H$_2$C=CH—CH$_2$—O— | 5.1~5.3 ppm |
| H$_2$C=CH—CH$_2$—O— | 5.7~5.9 ppm |

Based on the afore-mentioned results, the structure of the main component of the obtained compound 1 is determined to be such represented by the following formula.

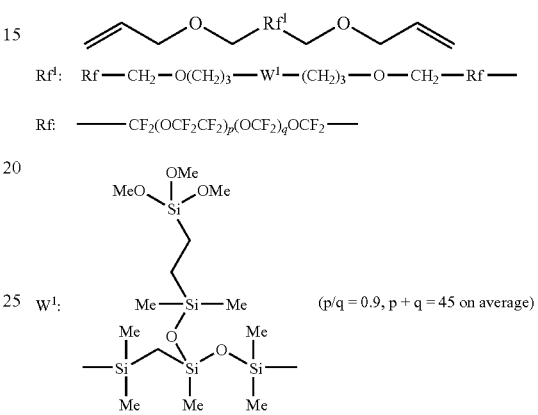

Preparation Example 2

50 g of compound 1, 1.9 g of pentamethyldisiloxane, and 100 g of m-xylenehexafluoride were mixed with stirring, and heated to 90 degrees C. Then, 0.18 g of a solution of chloroplatinic acid/vinyl siloxane complex in toluene (containing $4.5\times10^{-8}$ mole of Pt) was added and, then stirred at 90 degrees C. for 3 hours. Subsequently, the solvent and the unreacted siloxane were distilled off under reduced pressure to obtain 48 g of a pale yellow, transparent liquid, perfluoropolyether, hereinafter referred to as compound 2.

Figure 2:
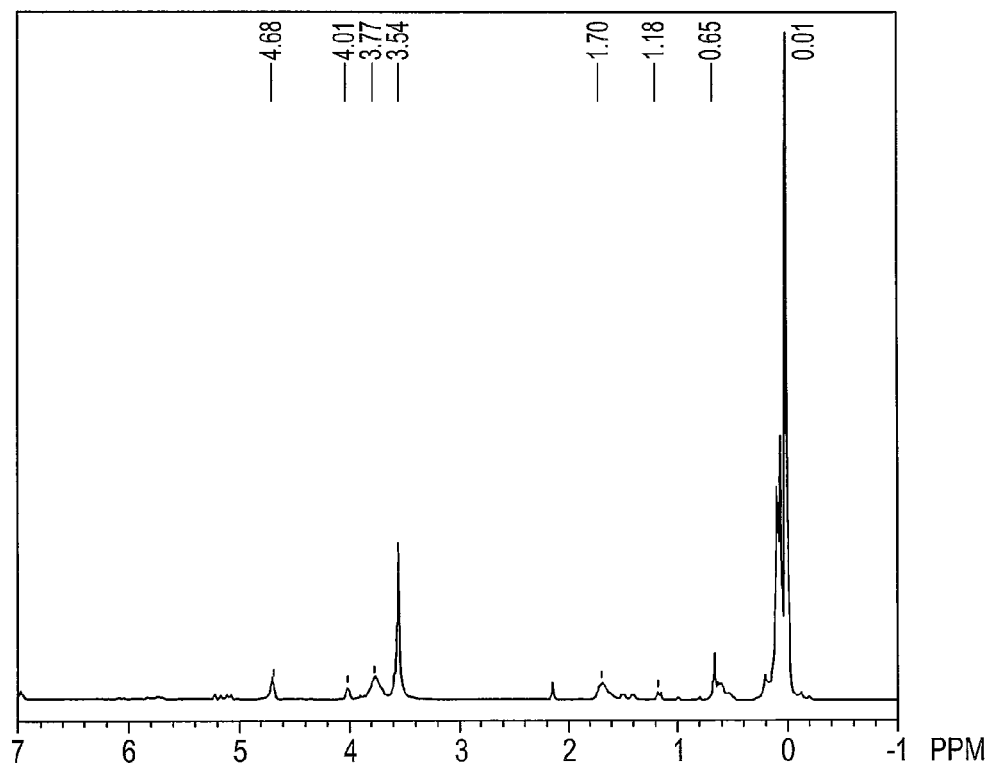
FIG. 2 is an NMR chart of compound 2 prepared in Preparation Example 2.

The $^1$H-NMR chart of compound 2 is shown in FIG. 2 and the chemical shifts are shown below.

$^1$H-NMR (reference: TMS, ppm)

| | |
|---|---|
| —SiCH$_3$  —CH— | 0~0.2 ppm |
| ≡SiCH$_2$CH$_2$Si≡ | 0.5~0.7 ppm |
| CH$_3$ | 1.1~1.2 ppm |
| —CH$_2$CH$_2$Si≡ | 1.6~1.8 ppm |
| —SiOCH$_3$ | 3.4~3.7 ppm |
| —CH$_2$OCH$_2$— | 3.6~3.8 ppm |

Based on the afore-mentioned results, the obtained compound 2 is determined to be represented by the following structure formula.

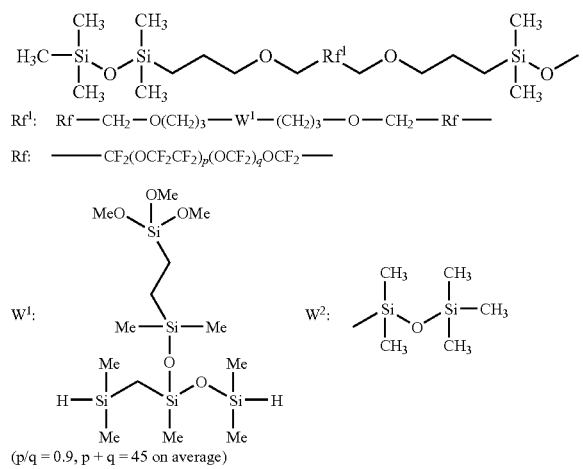

(p/q = 0.9, p + q = 45 on average)

Preparation Example 3

50 g of compound 1, 8.3 g of the fluorine-containing siloxane represented by the following formula (III), and 100 g of m-xylenehexafluoride were mixed with stirring and heated to 90 degrees C. Then, 0.18 g of a solution of chloroplatinic acid/vinyl siloxane complex in toluene (containing $4.5 \times 10^{-8}$ mole of Pt) was added and, then stirred at 90 degrees C. for 3 hours. Subsequently, the solvent and the unreacted siloxane were distilled off under reduced pressure to obtain 52 g of a pale yellow, transparent liquid, perfluoropolyether, hereinafter referred to as compound 3.

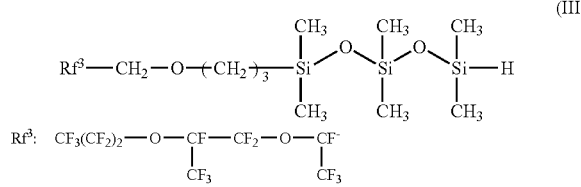

Figure 3:
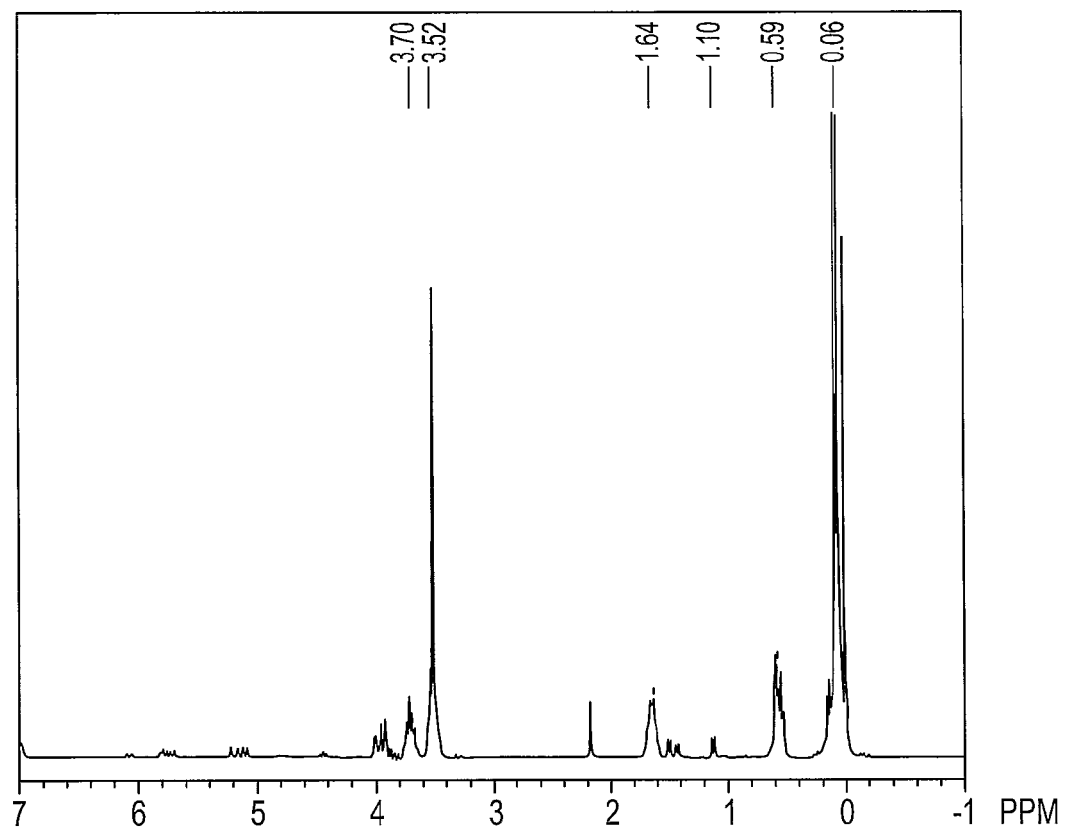
FIG. 3 is an NMR chart of compound 3 prepared in Preparation Example 3.

The $^1$H-NMR chart of compound 3 is shown in FIG. 3 and the chemical shifts are shown below.

$^1$H-NMR (reference: TMS, ppm)

| | |
|---|---|
| —SiCH₃   —CH— | 0~0.2 ppm |
| ≡SiCH₂CH₂Si≡ | 0.5~0.7 ppm |
| —CH₃ (branch) | 1.1~1.2 ppm |
| —CH₂CH₂Si≡ | 1.6~1.8 ppm |
| —SiOCH₃ | 3.4~3.7 ppm |
| —CH₂OCH₂— | 3.6~3.8 ppm |

Based on the afore-mentioned results, the obtained compound 3 is determined to be represented by the following structure formula.

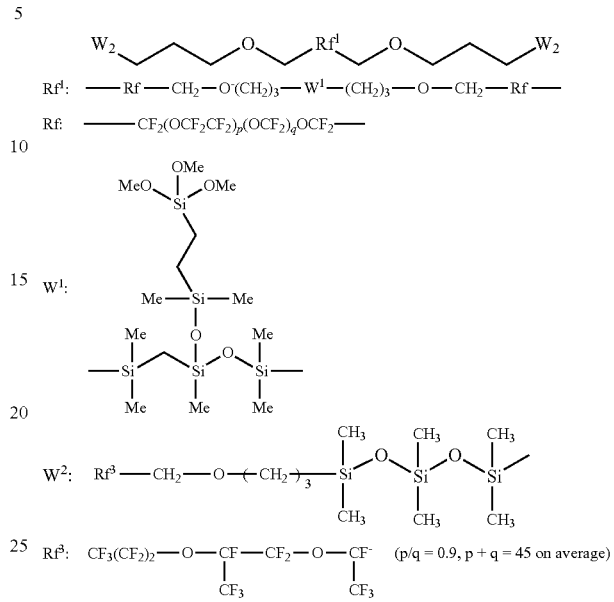

(p/q = 0.9, p + q = 45 on average)

Example 1

A cylindrical porous ceramic pellet of 5 mm in diameter and 3 mm in height was impregnated with 0.5 g of a solution of 20 g of compound 1 dissolved in 80 g of m-xylenehexafluoride and, then, dried at 70 degrees C. for 1 hour. The pellet was placed on a molybdenum board which is an electric resistance heating body, and placed inside a vacuum vapor deposition device (HSV-3-3G from Sato Vac Inc.). Separately, six pieces of slide glass were also placed inside the afore-mentioned vacuum deposition device. Then, the device was evacuated until the pressure in the vacuum deposition device was $5 \times 10^{-3}$ Torr or lower. Subsequently, the afore-mentioned molybdenum board was heated to 500 degrees C. or higher to vacuum deposit compound 1 on the slide glass. The obtained slide glass was left for 24 hours in an atmosphere of 25 degrees C. and a humidity of 40%. Then, three pieces of the glass were immediately evaluated for the afore-mentioned properties. The other three pieces were subjected to the afore-mentioned abrasion procedure and, then, evaluated for the afore-mentioned properties.

Example 2

Compound 2 was evaluated in the same manner as in Example 1, except that compound 2 was used instead of compound 1 in Example 1.

Example 3

Compound 3 was evaluated in the same manner as in Example 1.

Comparative Examples 1 to 7 and Reference Example 1

The following compounds 4 to 11 were evaluated in the same manner as in the Examples.

Compound 4

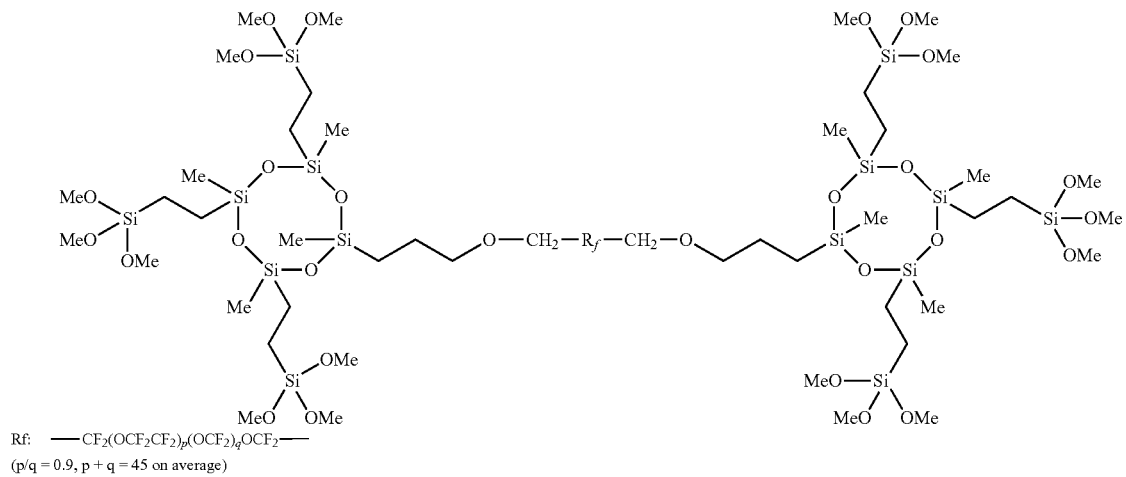

Rf: —CF$_2$(OCF$_2$CF$_2$)$_p$(OCF$_2$)$_q$OCF$_2$—
(p/q = 0.9, p + q = 45 on average)

Compound 5

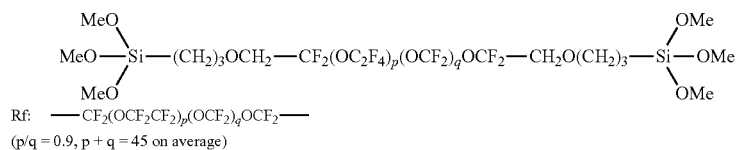

Rf: —CF$_2$(OCF$_2$CF$_2$)$_p$(OCF$_2$)$_q$OCF$_2$—
(p/q = 0.9, p + q = 45 on average)

Compound 6

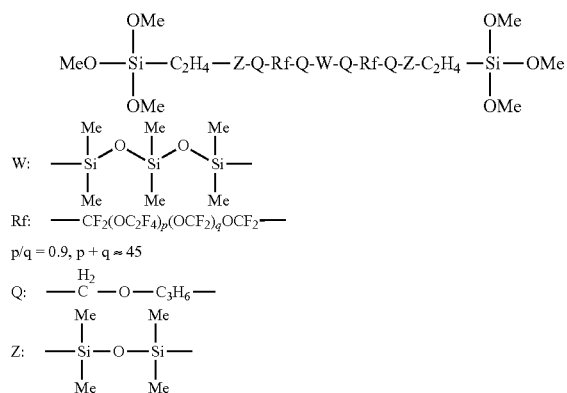

Rf: —CF$_2$(OC$_2$F$_4$)$_p$(OCF$_2$)$_q$OCF$_2$—
p/q = 0.9, p + q ≈ 45

Compound 7

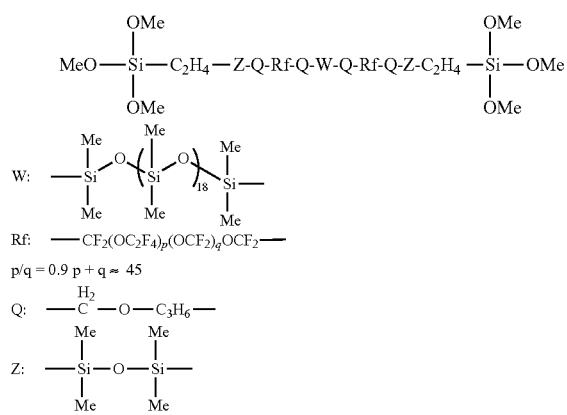

Rf: —CF$_2$(OC$_2$F$_4$)$_p$(OCF$_2$)$_q$OCF$_2$—
p/q = 0.9 p + q ≈ 45

-continued

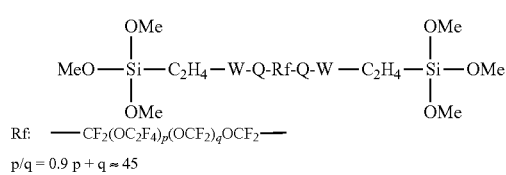
Compound 8

Rf: —CF$_2$(OC$_2$F$_4$)$_p$(OCF$_2$)$_q$OCF$_2$—
p/q = 0.9 p + q ≈ 45

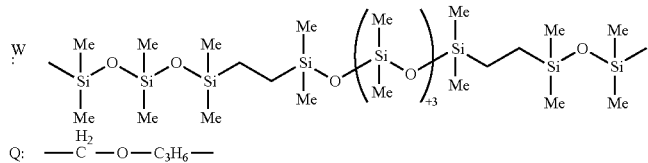

Q: —CH$_2$—O—C$_3$H$_6$—

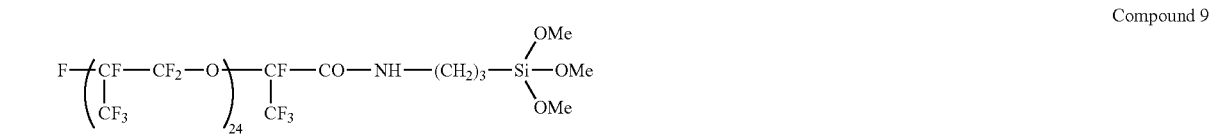
Compound 9

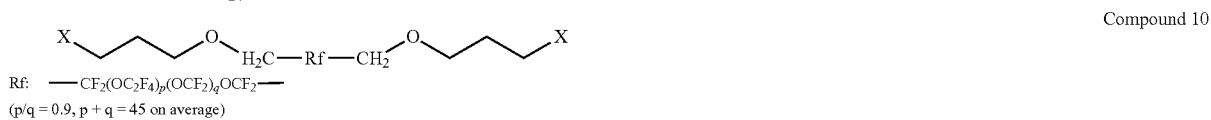
Compound 10

Rf: —CF$_2$(OC$_2$F$_4$)$_p$(OCF$_2$)$_q$OCF$_2$—
(p/q = 0.9, p + q = 45 on average)

In compound 10, x is a mixture of the following (c) and (d) in a ratio of 57:43.

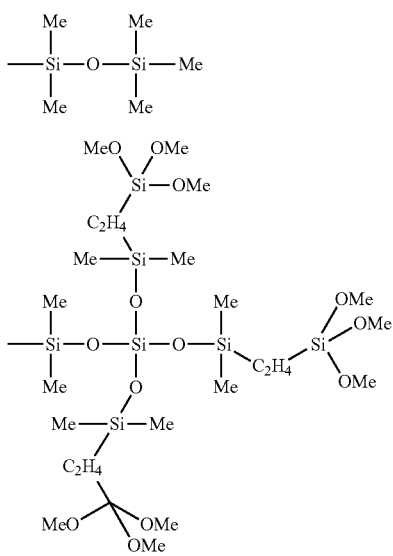

-continued

W3-Q-Rf-Q-W1-Q-Rf-Q-W3

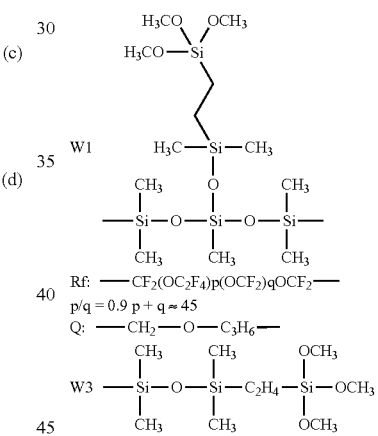

Rf: —CF$_2$(OC$_2$F$_4$)p(OCF$_2$)qCF$_2$—
p/q = 0.9 p + q ≈ 45
Q: —CH$_2$—O—C$_3$H$_6$—

The results in the evaluation made immediately after the coating was prepared are as seen in Table 1 and those after the abrasion procedure are as seen in Table 2.

TABLE 1

|  |  | Water Contact Angle (°) | Oleic Acid Contact Angle (°) | Dynamic Friction Coefficient | Slipping Property | Stain Wiping Property |
|---|---|---|---|---|---|---|
| Example 1 | Compound 1 | 105 | 65 | 0.05 | A | A |
| Example 2 | Compound 2 | 104 | 64 | 0.05 | A | A |
| Example 3 | Compound 3 | 108 | 67 | 0.06 | A | A |
| Comparative Example 1 | Compound 4 | 107 | 66 | 0.12 | C | A |
| Comparative Example 2 | Compound 5 | 110 | 69 | 0.10 | C | A |
| Comparative Example 3 | Compound 6 | 108 | 65 | 0.08 | B | A |

TABLE 1-continued

|  |  | Water Contact Angle (°) | Oleic Acid Contact Angle (°) | Dynamic Friction Coefficient | Slipping Property | Stain Wiping Property |
|---|---|---|---|---|---|---|
| Comparative Example 4 | Compound 7 | 104 | 60 | 0.03 | B | B |
| Comparative Example 5 | Compound 8 | 103 | 60 | 0.03 | B | B |
| Comparative Example 6 | Compound 9 | 113 | 73 | 0.21 | D | B |
| Comparative Example 7 | Compound 10 | 106 | 66 | 0.08 | B | A |
| Reference Example 1 | Compound 11 | 106 | 65 | 0.10 | C | A |

TABLE 2

|  |  | Water Contact Angle (°) | Oleic Acid Contact Angle (°) | Dynamic Frication Coefficient | Slipping Property | Stain Wiping Property |
|---|---|---|---|---|---|---|
| Example 1 | Compound 1 | 102 | 64 | 0.08 | A | A |
| Example 2 | Compound 2 | 103 | 63 | 0.08 | A | A |
| Example 3 | Compound 3 | 105 | 65 | 0.09 | B | A |
| Comparative Example 1 | Compound 4 | 105 | 64 | 0.15 | C | B |
| Comparative Example 2 | Compound 5 | 98 | 58 | 0.15 | C | C |
| Comparative Example 3 | Compound 6 | 98 | 59 | 0.15 | B | C |
| Comparative Example 4 | Compound 7 | 102 | 56 | 0.14 | B | D |
| Comparative Example 5 | Compound 8 | 100 | 55 | 0.12 | B | D |
| Comparative Example 6 | Compound 9 | 92 | 56 | 0.26 | D | C |
| Comparative Example 7 | Compound 10 | 102 | 64 | 0.12 | C | B |
| Reference Example 1 | Compound 11 | 106 | 65 | 0.12 | C | A |

As seen in Tables 1 and 2, all of the coatings of the Examples had a low dynamic friction coefficient, a good slipping property and a good stain wiping property even after the abrasion procedure.

The compound of Comparative Example 1 has many hydrolysable groups on the ends and, therefore, the durability of the contact angle was good but the surface slipping property was bad. This applies also to Comparative Example 7 on the compounds which has the terminal group represented by formula (d) and Reference Example 1.

Compound 5 of Comparative Example 2 has the siloxane moiety only on its ends, and the siloxane moiety of compound 6 of Comparative Example 3 is short and, therefore, the antiabrasion property was bad.

Compound 6 of Comparative Example 4 and Compound 7 of Comparative Example 5 have a polydimethylsiloxane group and, therefore, the slipping property was good. However, the both ends bonded to the substrate and, therefore, the slipping property was worse than in the Examples.

INDUSTRIAL APPLICABILITY

The perfluoropolyoxyalkylene group-containing polymer of the present invention has a good surface slipping property and a stain wiping property and, therefore, can provide a coating with less deterioration in the performance, even where the stain wiping is performed daily. Therefore, the present polymer can be used suitably in articles of which slipping property and stain wiping property are important, such as mobile phones, PDA's, portable music players, car navigation equipments, ATM's, and lenses of spectacles.

The invention claimed is:

1. A perfluoropolyoxyalkylene group-containing polymer represented by the following formula (1),

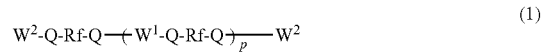

$$W^2\text{-Q-Rf-Q}-(W^1\text{-Q-Rf-Q})_p-W^2 \quad (1)$$

wherein Rf is a group having a perfluoropolyoxyalkylene group; $W^1$ is a divalent organosiloxane group having at least one group represented by the following formula (2); $W^2$ is a monovalent group selected from an alkyl group, an alkenyl group, an alkenyloxyalkyl group, an aryl group and an organosiloxane group represented by the following formula (3), and the combinations thereof, the monovalent group having 1 to 300 carbon atoms and being optionally substituted with one or more fluorine atoms and; Q is, independently of each other, a divalent linking group having 2 to 12 carbon atoms, optionally containing one or more oxygen atoms, nitrogen atoms, or fluorine atoms; and p is an integer of from 1 to 20,

$$-C_yH_{2y}-\underset{\underset{R^1_{3-a}}{|}}{Si}-X_a \quad (2)$$

wherein X is a hydrolysable group; R¹ is an alkyl group having 1 to 4 carbon atoms or a phenyl group; y is an integer of from 1 to 5; and a is 2 or 3,

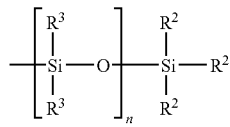 (3)

wherein R² and R³ each are, independently of each other, a group selected from an alkyl group having 1 to 200 carbon atoms, an aryl group having 1 to 200 carbon atoms, and an alkyloxyalkyleneoxyalkyl group having 1 to 200 carbon atoms and may optionally be substituted with one or more fluorine atoms; and n is an integer of from 0 to 50.

2. The perfluoropolyoxyalkylene group-containing polymer according to claim 1, wherein Rf in formula (1) is a group containing a divalent perfluorooxyalkylene group represented by the following formula, —$(C_cF_{2c}O)_d$— wherein c in the repeating unit is, independently of each other, an integer of from 1 to 6; and d is an integer of from 2 to 100.

3. The perfluorooxyalkylene group-containing polymer according to claim 1 or 2, wherein Rf in formula (1) is selected from the group consisting of the groups represented by the following general formula (4), (5), or (6), —$C_eF_{2e}(OCF_2CF)_fO(C_gF_{2g}O)_h(CFCF_2O)_iC_eF_{2e}$— (4)
        |                    |
        Y                    Y wherein Y is, independently of each other, F or CF₃; e is an integer of from 1 to 3; g is an integer of from 2 to 6, f and i each are an integer of from 0 to 100, provided that a total of f and i is from 2 to 100; h is an integer of from 0 to 6; and these repeating units may be sequenced at random, —$C_eF_{2e}(OCF_2CF_2CF_2)_jOC_eF_{2e}$— (5)

wherein j is an integer of from 1 to 100; and e is an integer of from 1 to 3,

—$C_eF_{2e}(OCF_2CF)_k(OCF_2)_lOC_eF_{2e}$— (6)
        |
        Y wherein Y is F or a CF₃ group; e is an integer of from 1 to 3; k and l each are an integer of from 0 to 100, provided that a total of k and l is from 2 to 100; and these repeating units may be sequenced at random.

4. The perfluorooxyalkylene group-containing polymer according to claim 3, wherein Rf in formula (1) is represented by the following general formula (7), —$CF_2(OCF_2CF_2)_m(OCF_2)_nOCF_2$— (7)

wherein m is an integer of from 0 to 50; and n is an integer of from 1 to 50, provided that a total of m and n is an integer of from 2 to 60.

5. The perfluoropolyoxyalkylene group-containing polymer according to claim 1, wherein W¹ is a group represented by the following general formula (A) or (B), $Si_nR^4{}_{2n-k}(C_yH_{2y}SiR^1{}_{3-a}X_a)_kO_{n-1}$ (A)

$Si_mR^4{}_{2m-2-k}(C_yH_{2y}SiR^1{}_{3-a}X_a)_kO_m$ (B)

wherein R¹, y, a, and X are as defined above; R⁴ is, independently of each other, a hydrogen atom or a monovalent hydrocarbon group; n is an integer of from 4 to 42; k is an integer of from 1 to 5; and m is an integer of from 3 to 5.

6. The perfluoropolyoxyalkylene group-containing polymer according to claim 1, wherein X in formula (2) is an alkoxy group; and W¹ is represented by the following formula (8) or (10-1)

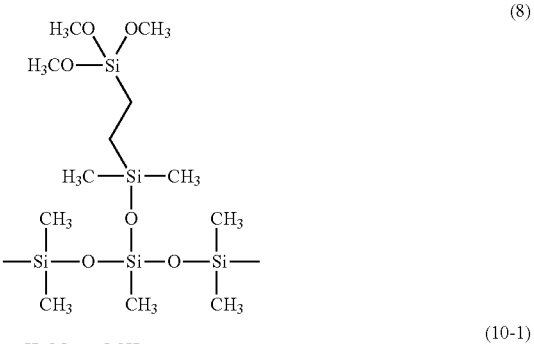 (8)

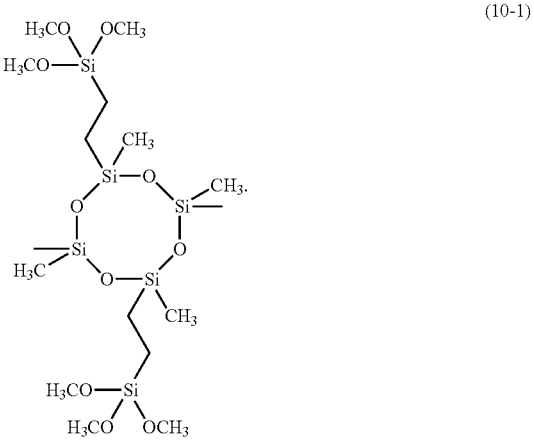 (10-1)

7. The perfluoropolyoxyalkylene group-containing polymer according to claim 1, wherein X is an alkoxy group; and W² is an organosiloxane group represented by formula (3), wherein R² and R³ are an alkyl group having 1 to 4 carbon atoms or a phenyl group; and n is 1.

8. The perfluoropolyoxyalkylene group-containing polymer according to claim 1, wherein X in formula (2) is an alkoxy group and W² is an alkenyl group.

9. The perfluoropolyoxyalkylene group-containing polymer according to claim 1, wherein X in formula (2) is an alkoxy group and W² is an organosiloxane group represented by formula (3), wherein at least one R² in formula (3) is a partially or wholly fluorinated alkyloxyalkyleneoxyalkyl group.

10. The perfluoropolyoxyalkylene group-containing polymer according to claim 1, wherein Q in formula (1) is a group having an amide bond, an ether bond, an ester bond or a vinyl bond.

11. A surface treating agent composition comprising the perfluoropolyoxyalkylene group-containing polymer according to claim 1 and/or a partial hydrolysis condensate thereof.

12. An article having a cured coating made from the perfluoropolyoxyalkylene group-containing polymer according to claim 1 and/or a partial hydrolysis condensate thereof on the surface thereof.

* * * * *